March 8, 1966 E. L. CHRISTIAN 3,239,024
LOAD CARRIER WITH ADJUSTABLY MOUNTED GAS SUPPORTED PADS
Filed May 7, 1963 3 Sheets-Sheet 1

INVENTOR.
EARL L. CHRISTIAN
BY *Carl R. Brown*

ATTORNEY

March 8, 1966  E. L. CHRISTIAN  3,239,024
LOAD CARRIER WITH ADJUSTABLY MOUNTED GAS SUPPORTED PADS
Filed May 7, 1963  3 Sheets-Sheet 2

INVENTOR.
EARL L. CHRISTIAN
BY *Carl R. Brown*
ATTORNEY

March 8, 1966  E. L. CHRISTIAN  3,239,024
LOAD CARRIER WITH ADJUSTABLY MOUNTED GAS SUPPORTED PADS
Filed May 7, 1963  3 Sheets-Sheet 3
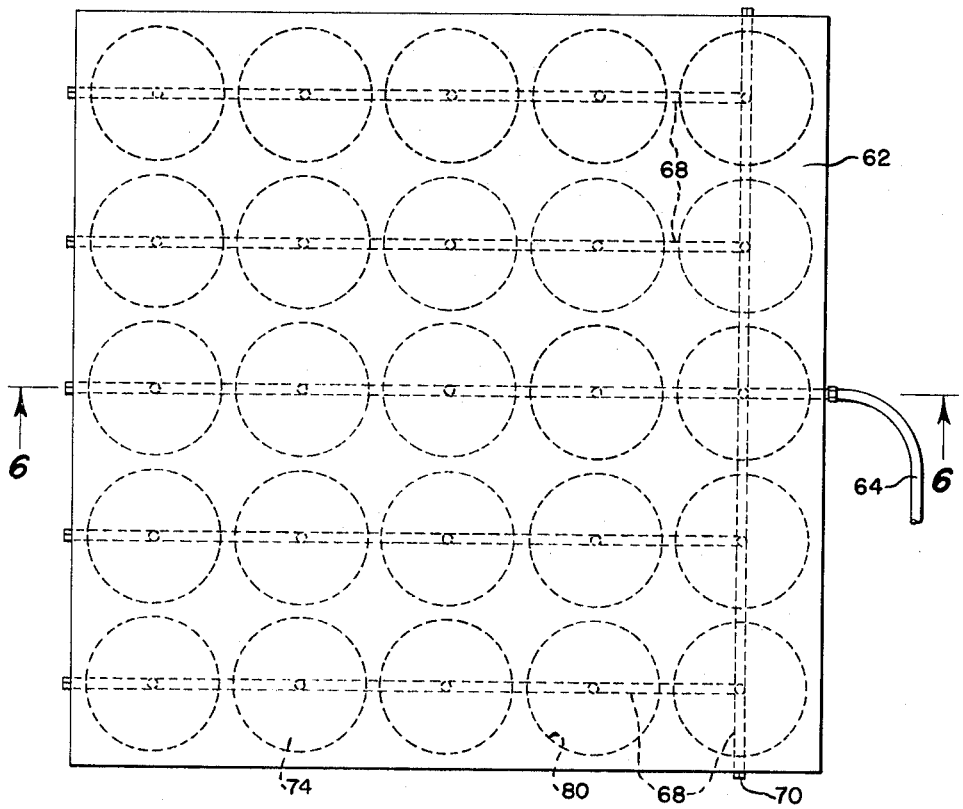
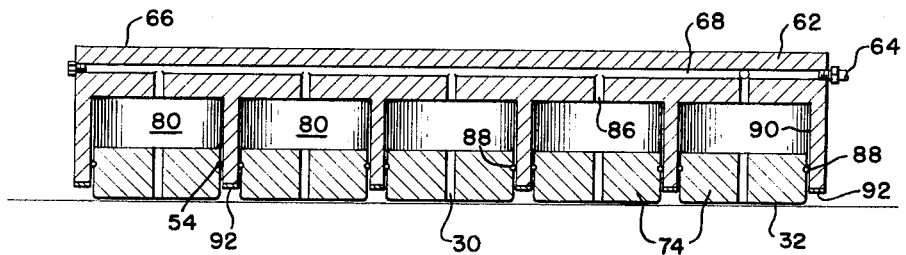
INVENTOR.
EARL L. CHRISTIAN
BY
ATTORNEY United States Patent Office 3,239,024
Patented Mar. 8, 1966

3,239,024
LOAD CARRIER WITH ADJUSTABLY MOUNTED
GAS SUPPORTED PADS
Earl L. Christian, San Diego, Calif., assignor to General
Dynamics Corporation, San Diego, Calif., a corporation of Delaware
Filed May 7, 1963, Ser. No. 278,554
3 Claims. (Cl. 180—7)

This invention relates to an improved gas supported load carrier, such as a pallet, dolly or other devices for carrying loads. The load carrier is supported by gas supported means that engages a ground plane and is thus able to carry and maneuver heavy loads with little frictional resistance between the carrier and the ground.

The present invention utilizes a plurality of precision gas supporting members, such as are described in the assignee's co-pending application Ser. No. 159,667, filed Dec. 15, 1961 and since abandoned, that are coordinated to support a carrier for effectively carrying heavy loads such as heavy machinery or the like with the carrier being capable of being raised by appropriate jacking members or the like to contact and raise the machinery.

It is therefore an object of this invention to provide a new and improved gas supported load carrier.

Other objects and advantages of this invention will hereinafter become more fully apparent from the following description of the annexed drawings, which illustrate preferred embodiments, and wherein FIGURE 1 is a top view of the gas supported load carrier of this invention;

FIGURE 5 is a top view of a modification of the invention that has a plurality of gas supported members closely arranged;

FIGURE 6 is a cross-sectional view of FIGURE 5 taken along lines 6—6.

Figure 1:
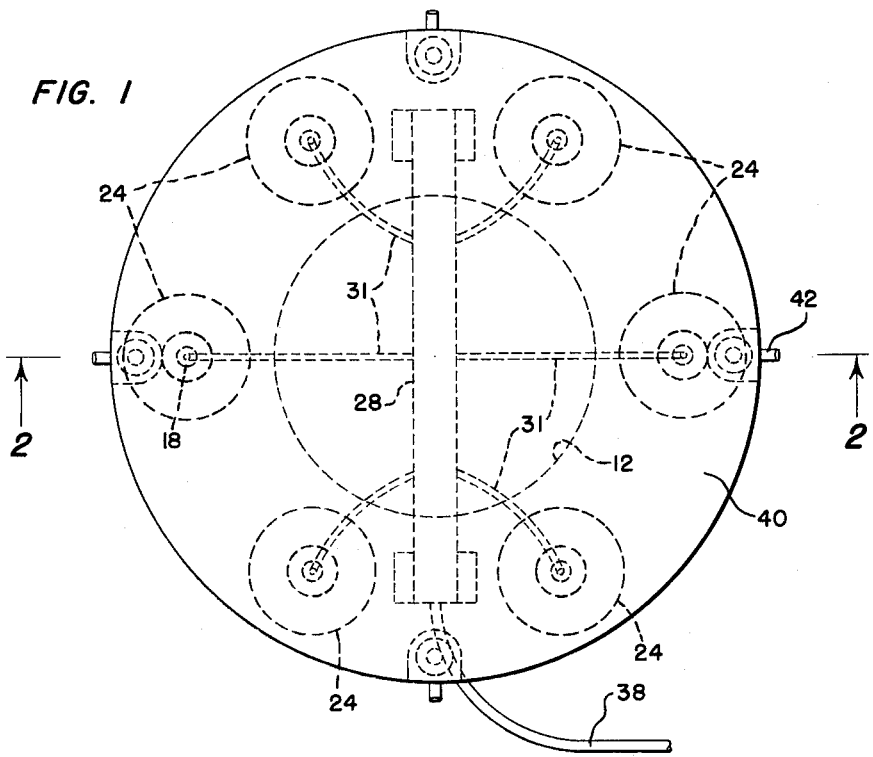
Figure 2:
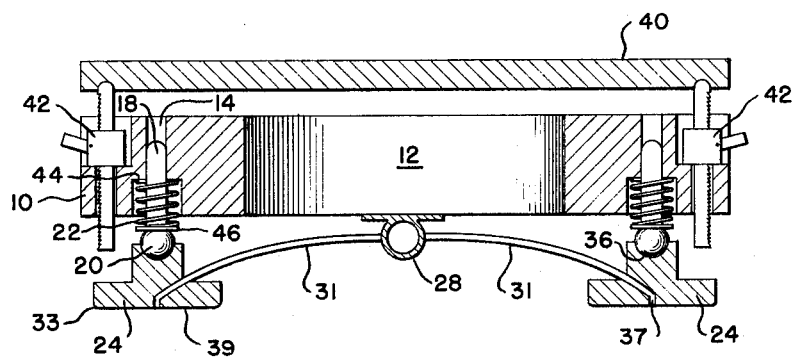
FIGURE 2 is a cross-sectional view taken along lines 2—2 of FIGURE 1.

Referring now to FIGURES 1 and 2, a load carrier with a load carrying member 10 is shown having a circular shape with an open center space 12 for reducing weight. The load carrying member 10 may also be square shaped or have other shapes. The load carrying member 10 has, at displaced points a recess or bore 14 cut therethrough for slidably receiving a movable pin member 18. Pin member 18 has mounted on its end, swivel ball means 20 and a collar 46. The bore 14 has a counterbore on the underneath side of the load carrying member 10, forming a shoulder 44. Resilient or spring means 22 is positioned between the shoulder 44 and the collar 46 for resiliently biasing the ball member 20 away from the uniform underneath surface of the load carrying member 10. Gas supporting members 24 have grooves 36 for mating with the ball members 20. This allows swiveling or rotatory action of the gas supporting members 24 around ball members 20 and also through the spring arrangement 22, the gas supporting members 24 may move vertically relative to the ground plane and to the load carrying member 10.

Figure 3:
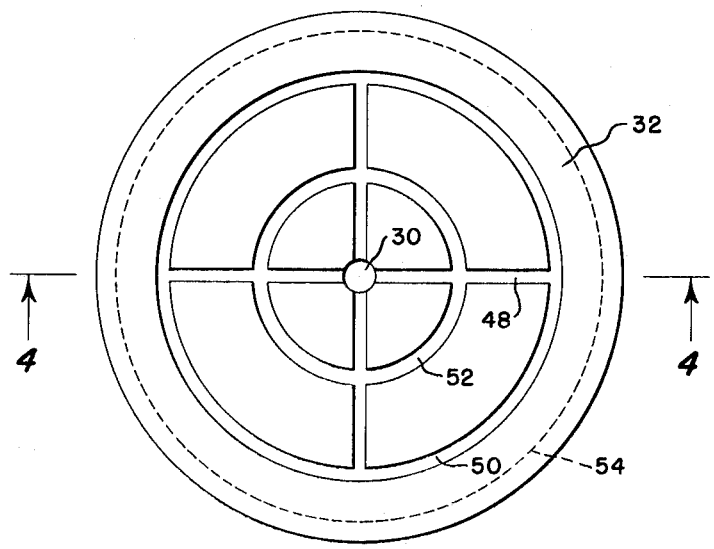
FIGURE 3 is a bottom view of a gas supporting member.
Figure 4:
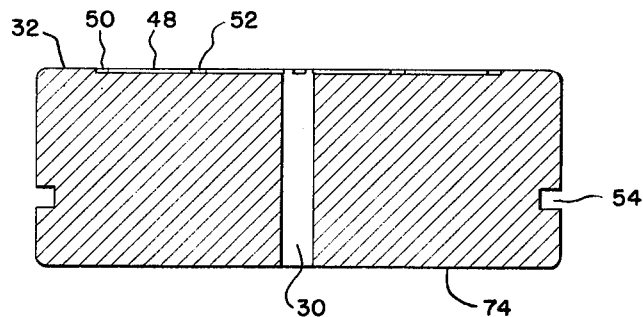
FIGURE 4 is a cross-sectional view taken along lines 4—4 of FIGURE 3.

The gas supporting members 24 have ground engaging surfaces 39 that may be the same as surface 32 that is shown in FIGURES 3 and 4. Surface 32 has channels 48, 50, and 52 for conducting gas or air under pressure, that is received through orifice 30. In the embodiment of FIGURES 1 and 2, an air manifold means 28 obtains gas or air under pressure through line 38 from an appropriate source (not shown) and through lines 31, that may be constructed of aluminum or like material, distributes the pressurized gas to orifices 37. Orifices 37 are the same in function, purpose and operation as orifices 30 in FIGURES 3 and 4.

A second load carrying member 40 is supported by as well as above the load carrying member 10. The distance between the second load member 40 and the load carrying member 10 or the ground plane may be selectively adjusted by jack means 42 in the normal manner. It should be recognized that a load may be carried by load member 10 or by second load member 40 where the latter is present.

Referring now to FIGURE 5, there is shown a top view of a composite gas supported carrier 62 having a plurality of closely arranged gas supporting members 74. The upper surface 66 of the composite load carrying member 62 may carry any type of load but is preferably capable of carrying heavy equipment or the like. Normally the load carrying member 62 would be of a solid unitary construction having air conduits 68 channeled therein for carrying gas or air under pressure to respective circular bores 80 cut into the uniform undersurface of the composite load carrying member 62. Gas may pass from a suitable source through line 64 to the conduits 68. Plug members 70 which seal the conduits at their outer ends allow the system to be purged where necessary, and also allow for ease of construction.

Pressurized gas or air passes through line 64 and through separate conduits 68 to the several recesses or bores 80. There is positioned in each bore 80 a gas supporting member 74 having a bearing surface 32 as shown in FIGURE 3. While it should be recognized that any suitable gas bearing surface may be used in the gas supporting members of FIGURE 6 and FIGURE 1, it is particularly advantageous to use the bearing surface configuration shown in FIGURE 3, which is discussed in greater detail in applicant's copending application Ser. No. 159,667.

The gas supporting members 74 are thus positioned, as shown in FIGURE 6, in the bores 80 and have a ring groove 54 in their outer circumferential surface for receiving an O-ring 88. O-ring 88 effects the seal between the outer surface of the member 74 and the inner surface 90 of the bore 80 with sufficient spacing between the member 74 and the bore surface 90 to permit lateral movement therebetween, reducing necessary tolerances. Brake shoe means 92 are placed on the surfaces of the load carrying member 66 between the open ends of the bores 80 for supporting the load carrying member 66 and not marring its underneath surface when no air pressure is provided through line 64. The brake shoe means 92 allows the carrier 68 to be slidably moved to a position under the load to be carried or moved.

In operation, applicant's invention as shown in FIGURE 1, is carried or otherwise moved to a position under a load to be carried. If the second load carrying member 40 is not mounted onto the load carrying member 10, then the load is placed on the load carrying member 10. Suitably pressurized gas or air is supplied by a suitable source through line 38, through manifold 28 and through lines 31 to the gas supporting members 24. This pressurized gas diffuses through orifice 37 to the main channels, the intermediary channels, and the bordering channels, such as are shown in FIGURE 3, effecting a controlled gas pressure between surface 39 and the supporting ground. The force of the substantially trapped gas lifts the load carrier and the load from the ground and supports it on the gas. The load carrier and the load may then be easily moved over a substantially frictionless contact with the ground. Where there are undulations on the ground surface, the gas supported members 24 may swivel around the ball member 20 or may move vertically against the spring 22 as may be necessary to traverse such undulating surfaces. The bearing surfaces 39 are curved at the edges 33 to avoid digging into undulating surfaces.

Where it is desirable to use the load carrier of FIGURE 1, to move a heavy object not already positioned on the carrier, the carrier may be moved underneath a heavy load and the individual jacks or lifting devices 42 operated in the normal manner to raise the second load carrying member 40 to a position of lifting the load off the ground. It can be readily seen that a member 40 can also be used to raise loads on the embodiment shown in FIGURES 5 and 6.

In the operation of the embodiment of applicant's invention shown in FIGURES 5 and 6, the load to be carried is placed or otherwise positioned on the load carrying surface 66. The load carrying member may be slidably positioned under the load by sliding the member on the brake shoe surfaces 92. When in correct position, gas under pressure is then supplied through line 64, through internal conduits 68 and through individual lines 86 supplying pressurized gas to the cavity of bore 80. Once air is provided to the cavity its passage around the cylindrical gas supporting member 74 is opposed by O-ring 88. The gas, to escape from the cavity of bore 80, passes through the orifice 30. The restriction of orifice 30 is small enough to contain gas pressure in the cavity that sufficiently displaces the members 74 out of the bores 80 to a point that the surface 32 extends beyond the surface 92 of the load carrying member.

It may be seen that the uniformity of pressure applied to the bores 80 effects a cushioned opposition to movement of the gas supported members 74 inwardly into the bore 80 and thus allows the members to move in and out of bores 80 to traverse undulating surfaces.

Various modifications are contemplated and may obviously be resorted to by those skilled in the art, without departing from the spirit and scope of the invention as hereinafter defined by the appended claims, as only preferred embodiments thereof have been disclosed.

What is claimed as new is:

1. A gas supported load carrier comprising,
a load carrying member having an undersurface with a plurality of recesses in said undersurface,
movable members being positioned in said recesses with one end of said movable members projecting from said recesses,
means for resiliently biasing said movable members to said projecting position from said recesses,
and ground engaging gas supported members rotatably attached to said one end for supporting said load carrying member on a gound plane.

2. A gas supported load carrier comprising,
a load carrying member having an undersurface with a plurality of bores,
each of said bores having a counterbore therein forming a shoulder portion,
movable members being positioned in said bores with end portions projecting from said bores,
resilient means positioned between said shoulder and said end portions for resiliently biasing said end portions to a position away from said bore,
and ground engaging gas supported members rotatably attached to said end portions for supporting said load carrying member on a ground plane.

3. A gas supported load carrier comprising,
a load carrying member having a substantially flat undersurface with a plurality of bores in said undersurface,
each of said bores having a counterbore therein forming an internal shoulder portion,
pin members capable of being individually and movably positioned in said bores with a ball surface on the end of said pin members projecting from said bores,
means located between said shoulder portion and said ball surface for resiliently biasing said ball surface end of said pin away from said bore,
ground engaging gas supported members swivelly attached to said ball surface for supporting said load carrying member on a ground plane,
and air manifold means having lines connected to each of said ground engaging gas supported members.

References Cited by the Examiner

UNITED STATES PATENTS

| 2,938,590 | 5/1960 | Barnett | 180—7 |
| 3,013,505 | 12/1961 | Burke | 180—7 |
| 3,052,483 | 9/1962 | Peterson | 180—7 |
| 3,055,446 | 9/1962 | Vaughen | 180—7 |
| 3,082,836 | 3/1963 | Billman | 180—7 |
| 3,097,718 | 7/1963 | Jay et al. | 180—7 |
| 3,119,598 | 1/1964 | Peterson et al. | 180—7 |
| 3,121,401 | 2/1964 | Fields | 180—7 |
| 3,161,247 | 12/1964 | Mackie | 180—7 |
| 3,168,155 | 2/1965 | Cockerell | 180—7 |
| 3,185,238 | 5/1965 | Coates | 180—7 |

FOREIGN PATENTS

| 1,238,499 | 7/1960 | France. |

A. HARRY LEVY, *Primary Examiner.*

MILTON BUCHLER, *Examiner.*

M. A. KLEIN, *Assistant Examiner.*